United States Patent [19]

Marsh, Jr.

[11] 4,274,665
[45] Jun. 23, 1981

[54] WEDGE-TIGHT PIPE COUPLING

[76] Inventor: Richard O. Marsh, Jr., 703 Standard Life Bldg., Pittsburgh, Pa. 15222

[21] Appl. No.: 26,087

[22] Filed: Apr. 2, 1979

[51] Int. Cl.³ .............................................. F16L 13/14
[52] U.S. Cl. ...................................... 285/177; 29/511; 29/512; 29/520; 285/382; 285/382.4; 285/398; 403/279; 403/282
[58] Field of Search ...................... 285/382.4, 382, 421, 285/397, 398, 177, DIG. 2; 403/281, 282, 279, 280, 276; 29/511, 512, 520, 506

[56] References Cited

U.S. PATENT DOCUMENTS

| 879,382 | 2/1908 | Harris | 403/276 |
|---|---|---|---|
| 1,682,635 | 8/1928 | Smith | 285/382.4 X |
| 2,000,481 | 5/1935 | Harrison | 285/397 X |
| 2,125,552 | 8/1938 | Feldhoff | 403/281 |
| 3,560,030 | 2/1971 | Macks et al. | 285/382 X |
| 4,053,247 | 10/1977 | Marsh, Jr. | 285/382.4 X |

FOREIGN PATENT DOCUMENTS 2557628  7/1977  Fed. Rep. of Germany ........ 285/382.4

Primary Examiner—Thomas F. Callaghan
Attorney, Agent, or Firm—Buell, Blenko, Ziesenheim & Beck

[57] ABSTRACT

A pipe coupling for application to plain end pipe and pipe pile by a driving force. It provides much greater tensile strength than the double sleeve type of pipe coupling disclosed and claimed in my U.S. Pat. No. 4,053,247 in that it provides greater strength under tension. In one embodiment, a pair of tapered wedge rings are disposed in spaced coaxial relation within an outer cylindrical sleeve having corresponding tapered inner surfaces to provide tapered annular sockets into which pipe sections may be forced or driven to expand the diameter of the pipe. An annular shoulder on the sleeve forms the bottom of the annular sockets. Under tension, the tapered rings wedge the pipe against the outer sleeve to resist axial removal of the pipe from the coupling socket. In another embodiment, the tapered wedge rings are disposed in coaxial relation outside the cylindrical sleeve to form annular tapered sockets which serve to reduce the diameter of the pipe as it is driven into the socket. Various other modifications, utilizing a similar wedge-ring principle, serve to couple pipe sections of different diameters respectively. Another embodiment of coupling employs the wedge-ring principle to couple two sections of reenforced pre-cast concrete pipe pile. Another embodiment provides an end fitting for reenforcing the end of a pipe pile and employs the wedge-ring principle to resist removal of the end fitting.

14 Claims, 13 Drawing Figures

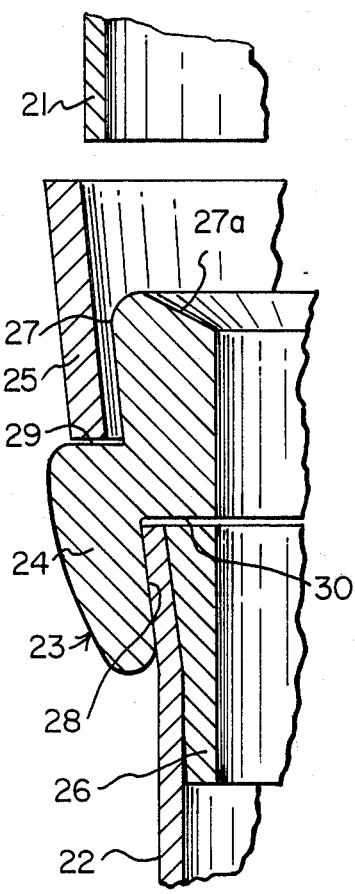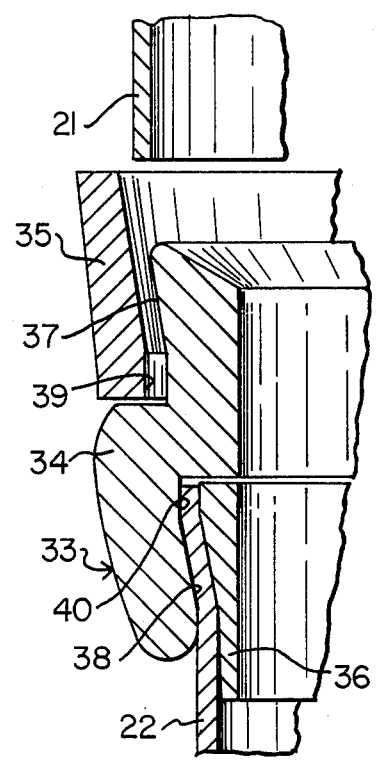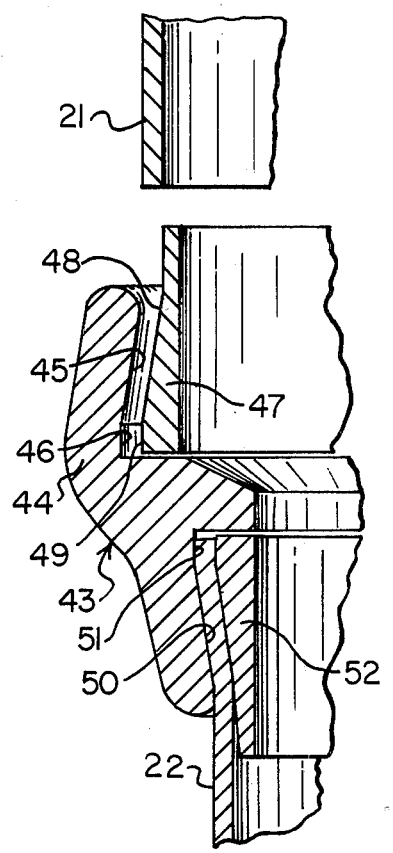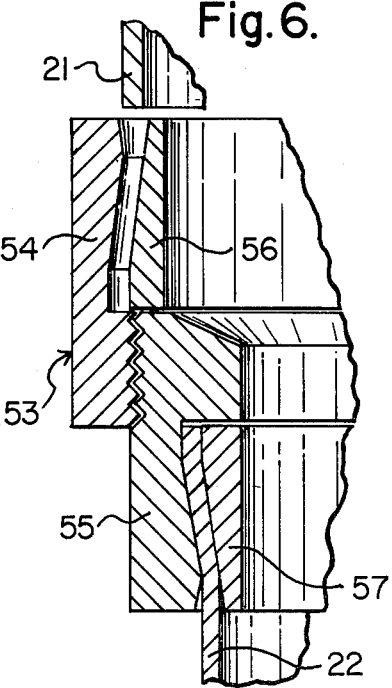

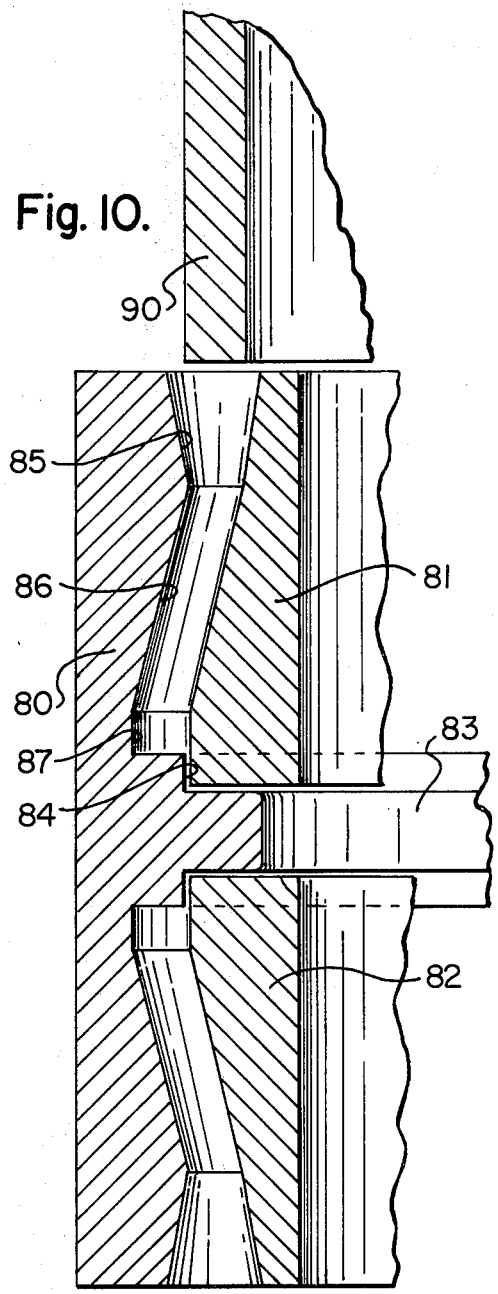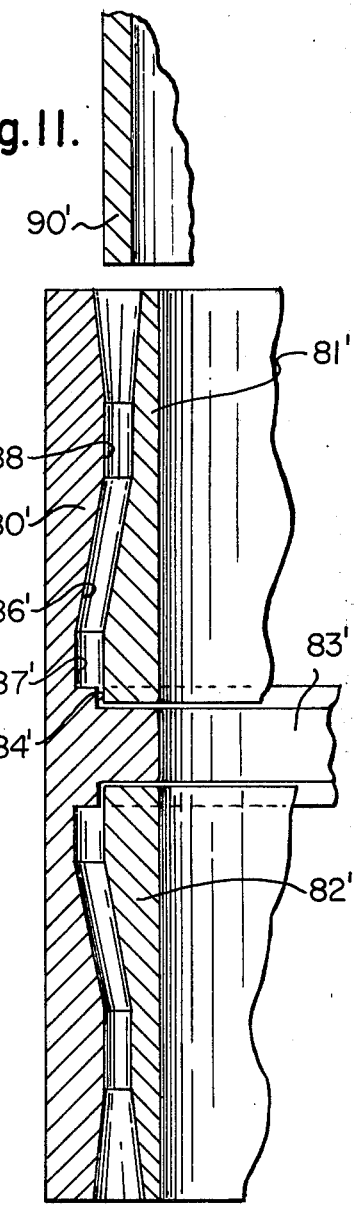

WEDGE-TIGHT PIPE COUPLING

This invention relates to couplings, of the force or drive fit type, for joining sections of plain end pipe and pipe pile, and provides much greater tensile strength than the pipe coupling described and claimed in my prior U.S. Pat. No. 4,053,247, issued Oct. 11, 1977, now in commercial production and sold under the trademark "Marnick". The Marnick coupling is a double sleeve type of coupling in which annular tapered sockets are provided at opposite ends into which the pipe sections may be forced or driven. The tapered sockets may be such as to cause expansion of the end of the pipe sections as they travel into the sockets. Also the sockets may taper inwardly to cause reduction in diameter of the pipe as it travels into the sockets. The Marnick coupling provides a leak-proof joint with considerable tensile strength.

It is the purpose of this invention to provide a very high strength force fit coupling for plain end pipe and pipe pile which will sustain tensile forces higher than the Marnick coupling is capable of sustaining. I refer to my new coupling as the Wedge-Tight Coupling. The new coupling is similar in principle to that of the Marnick coupling but differs therefrom in that the annular tapered sockets for the pipe are formed between two annular tapered rings disposed in concentric spaced relation to the outer sleeve. These tapered rings are capable of axial movement relative to the sleeve and abut a central annular shoulder or stop formed integrally or otherwise attached to the sleeve, which forms the inner end of the annular sockets.

As each pipe section is forced into the annular socket of the coupling, it expands over the tapered ring in the manner of a wedge, into tight metal-to-metal contact with the interior conical surface of the outer sleeve. For this coupling to yield under tension, one or both of two things must occur, namely: (1) The outer sleeve must expand, and/or (2) The expanded section at the end of the pipe must be reduced in diameter. I have found that, when tested to failure, the Marnick coupling has failed through reduction in diameter of the expanded section of the pipe. In my new wedgetight coupling, the tapered rings or wedge sleeves are free to move with the outward movement of the pipe and provide reenforcement within the pipe to prevent the expanded pipe section from reducing in diameter. Thus, failure of the coupling under tension can occur only by expansion of the outer sleeve along the conical section or due to tension at the thinnest point adjacent the center stop or ring. In my new wedge-tight coupling both of these points can be of sufficient strength so that the joint formed at the coupling can develop the full tensile strength of the pipe with which the coupling is used.

I further provide modified forms of a force fit coupling utilizing the wedge-tight principle, in which the tapered rings or wedge sleeves are disposed in concentric spaced relation exteriorly of an inner sleeve, thus providing annular sockets which reduce in diameter toward the center of the coupling.

I further provide couplings of the wedge-tight type for coupling pipe sections of different diameter.

I further provide couplings of the wedge-tight type in which the expansion of the pipe may exceed twice the thickness of the pipe made.

I further provide couplings of the wedge-tight type in which the central ring integral with the outer sleeve is provided with annular steps or shoulders for centering the wedge rings or sleeves in a coaxial position with regard to the outer sleeve.

I further provide couplings of the wedge-tight type adapted for coupling reenforced concrete pipe pile.

I further provide an end ring for reeforcing the end of a pipe or pipe pile in which the end ring is attached to the pipe by a coupling of the wedge-tight type.

Various preferred embodiments of the new improved wedge-tight type of coupling constituting my present invention are hereinafter described in detail, in connection with the accompanying drawings, wherein:

FIGS. 3, 4, 5 and 6 are fragmental sectional view, illustrating several embodiments of the wedge-tight coupling for coupling two pipe sections of different diameters;

FIGS. 10 and 11 are fragmental sectional views, illustrating embodiments having means for centering the wedge sleeves or rings within the outer sleeve;

Figure 1:
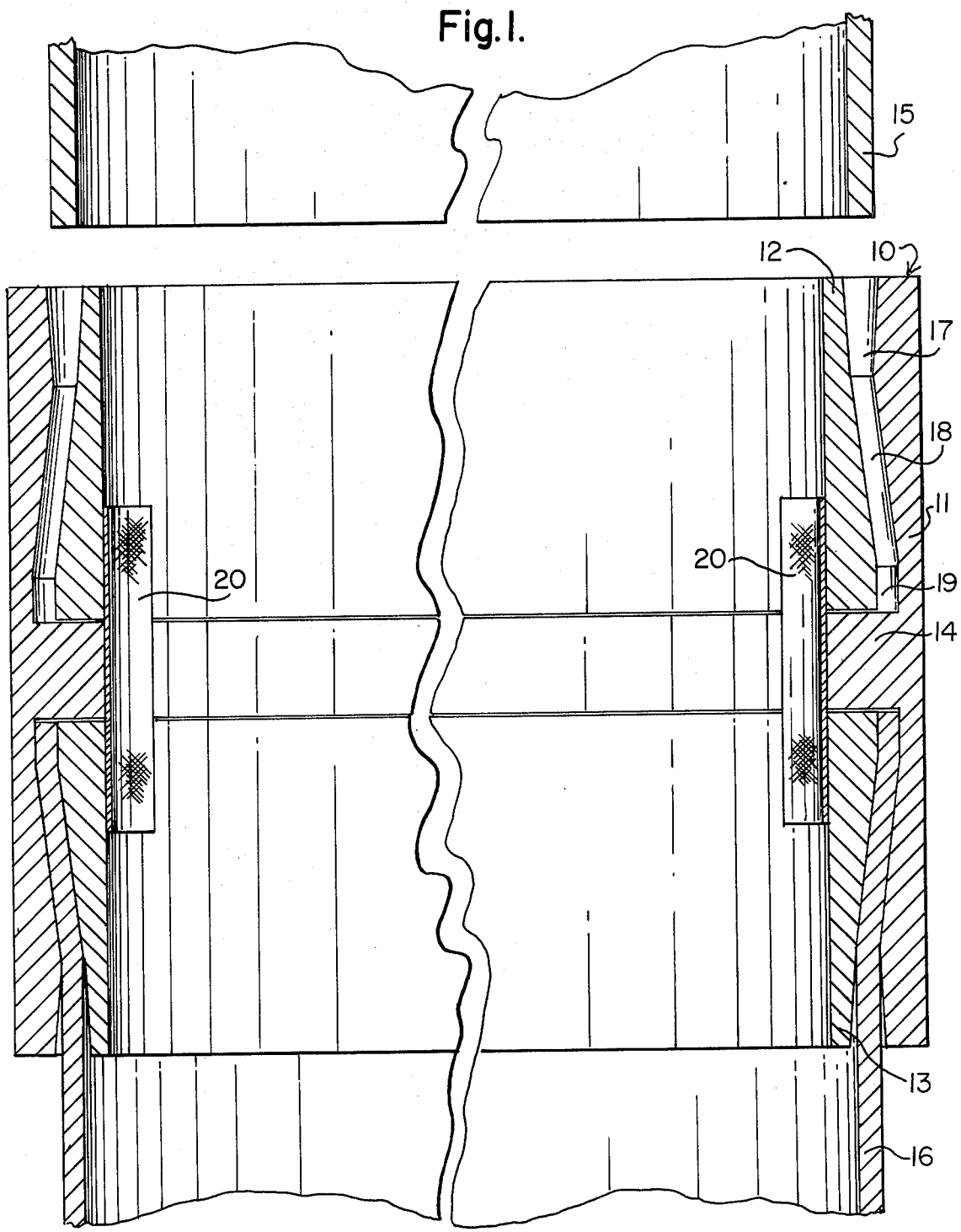
FIG. 1 is a sectional view, illustrating one embodiment of my wedge-tight coupling, in which the pipe end is expanded as the pipe is forced into the coupling.

Referring to FIG. 1 of the drawings, a preferred form of coupling 10, embodying my invention is shown. This embodiment of coupling comprises an outer sleeve 11 and two shorter sleeves 12 and 13 disposed within the outer sleeve and abutting opposite sides of a central projecting ring or shoulder 14 formed integrally with the sleeve 11. The interior of the outer sleeve varies in diameter from the outer ends to the central ring 14. The exterior surface of the shorter sleeves 12 and 13 and the interior surface of the outer sleeve cooperate and are so spaced as to provide an annular pocket or socket in which to force or drive the end of the pipe sections 15 and 16. As shown, the portion 17 of the annular sockets adajcent the opposite ends of the coupling are flared outwardly to assist in the entry of the pipe into the socket. The intermediate portion 18 of the socket is of conical or tapered form so as to cause the pipe to expand outwardly to a portion 19 of uniform or approximately uniform diameter. The portion 19 of the socket is preferably made of a length which is greater than the thickness of the socket.

The outer diameter of the shorter sleeves 12 and 13 is slightly less than the smallest internal diameter at the portion 17 of the sockets. Thus, prior to installation of the pipe sections into the coupling, the sleeves 12 and 13 may be moved in and out of the coupling as well as diametrically and concentrically. In order to hold the sleeves temporarily in position prior to installation of the pipe, strips of adhesive tape 20 are applied circumferentially interiorly of the short sleeves 12 and 13 in bridging relation to and contacting the central ring 14.

These adhesive strips may be removed after the installation of the pipe sections into the coupling.

It should be understood that while the coupling 10 may be employed to join pipes of any diameter, it is especially adapted for joining sections of pipe of relatively large diameter, such as pipe of 3 to 4 feet in diameter. Various methods may be employed for forcing or driving the pipe sections into the annular sockets of the couplings 10, as for example impaction or by "jacking" in the manner described in my copending application Ser. No. 967,965, filed Dec. 11, 1978.

As shown in FIG. 1, one of the pipe sections 15 is shown in position prior to entry into the annular socket of the coupling, while the other pipe section 16 is shown in position as driven fully into the socket into contact with the central stop ring 14.

Figure 2:
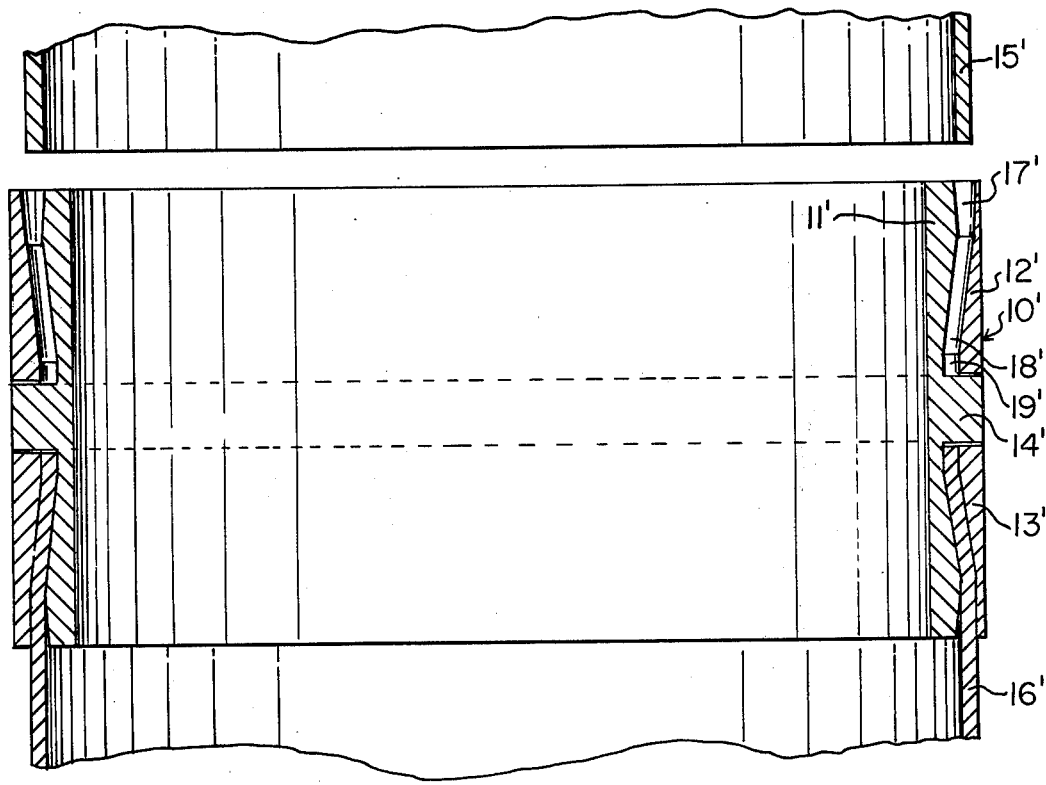
FIG. 2 is a sectional view, on a reduced scale, illustrating an embodiment of my wedge-tight coupling in which the pipe end is reduced in diameter as the pipe is forced into the coupling.

Referring to FIG. 2, a modification of the coupling 10 is shown and designated by the reference character 10'. Coupling 10' differs from coupling 10 in having an inner sleeve 11', and two relatively short sleeves or wedges 12' and 13' which concentrically surround the sleeve at opposite ends and which axially abut opposite sides of a radially outwardly projecting ring 14' integrally or otherwise attached to the sleeve 11'. In this coupling, the outer surface of the sleeve 11' and the interior surfaces of the sleeve 12' and 13' cooperate and are so spaced as to provide annular sockets into which the pipe sections 15' and 16' may be forced or driven.

In the coupling 10' the annular sockets differ from the annular sockets in coupling 10 in that they comprise an annular portion 17' at the outer end which serves as an entry to the socket, an intermediate conical portion 18' which differs from the conical portion 18 in that the diameter of the socket reduces instead of expanding, and a final portion 19' of minimum uniform diameter. Preferably, the portion 19' is longer in length than the thickness of the socket or the wall thickness of the pipe sections 15' and 16'.

While not shown, it will be understood by analogy to FIG. 1, that adhesive strips, similar to adhesive strips 20 of FIG. 1, may be provided for holding the three sleeves 11', 12' and 13' together prior to installation of the pipe sections 15' and 16'. Similarly to FIG. 1, pipe section 15' is shown in a position ready for entry into the annular socket at one end of the coupling 10', while pipe section 16' is shown in position as fully driven into the annular socket at the other end of the coupling.

Referring now to FIGS. 3, 4, 5 an 6, various similar embodiments of couplings are shown for joining two pipe sections 21 and 22 of different diameters respectively. FIG. 3 discloses a coupling 23 comprising a main ring member 24 and two auxiliary ring members 25 and 26. The auxiliary ring member 25 is tapered uniformly from end to end and concentrically surrounds a correspondingly tapered or conical outer surface 27 at one end of ring member 24. Similarly, auxiliary ring member 26 has a tapered annular surface on the exterior thereof that concentrically surrounds a conical surface 28 at the opposite end of ring member 24. The annular sockets provided between each of the ring members 25 and 26 and the ring member 24 are such as to cause reduction in diameter and expansion, respectively, of the pipe sections 21 and 22 as they are driven into their respective sockets. The annular inwardly sloping shoulder (27a) on the top of ring member 24 is adapted to receive impact blows from a mandrel. It will be noted also that the main ring member 24 is formed with offset flat annular surfaces 29 and 30 which serve as stops for the auxiliary ring members 25 and 26 respectively, as the pipe sections 21 and 22 are driven into the couplings.

FIG. 4 discloses a coupling 33 comprising a main ring member 34 and two auxiliary ring members 35 and 36 concentrically surrounding respective, conical surfaces 37 and 38 at opposite ends of the ring member 34. Coupling 33 differs from coupling 23 in that the innermost part 39 and 40 of the annular sockets formed between the auxiliary ring members and the main ring member 34 is cylindrical in form. The portions 39 and 40 have a length substantially in excess of the wall thickness of pipe sections 21 and 22.

FIG. 5 shows a coupling 43 which is a variation of the coupling 33. It comprises a main ring member 44 which differs from ring member 34 in having an upper annular portion with an internal conical surface 45 terminating in a cylindrical surface 46. An auxiliary ring member 47 is disposed within the conical surface 45 and has an exterior conical surface 48 conforming to the conical surface 45, and a cylindrical surface 49 conforming to the cylindrical surface 46. Thus, there is formed between the auxiliary ring member 47 and the surfaces 45 and 46 on the main ring member 44 an annular pocket into which the pipe section 21 may be driven.

The lower portion of the main ring member 44 has an internal conical surface 50 terminating in a cylindrical surface 51 similarly to the lower portion of the ring member 34, and an auxiliary ring member 52 disposed concentrically within the surfaces 50 and 51 to form an annular pocket into which a pipe section 22 may be driven.

FIG. 6 shows a coupling 53 similar to the coupling 43 except that it comprises a main ring member made in two parts 54 and 55 provided with female and male threads respectively, by which the two parts are joined together. Coupling 53 also comprises two auxiliary ring members 56 and 57 disposed, similarly to the ring members 47 and 52, concentrically within corresponding conical and cylindrical surfaces.

Figure 7:
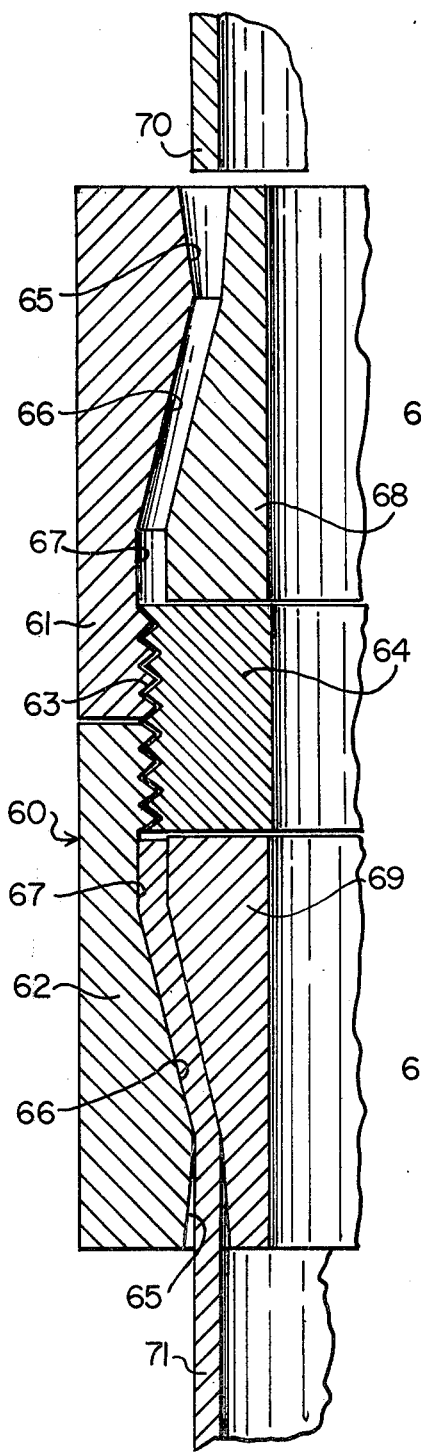
FIGS. 7, 8 and 9 are fragmental sectional views, illustrating embodiments of the wedge-tight coupling, in which expansion of the pipe in the coupling may exceed twice the wall thickness of the pipe.
Figure 8:
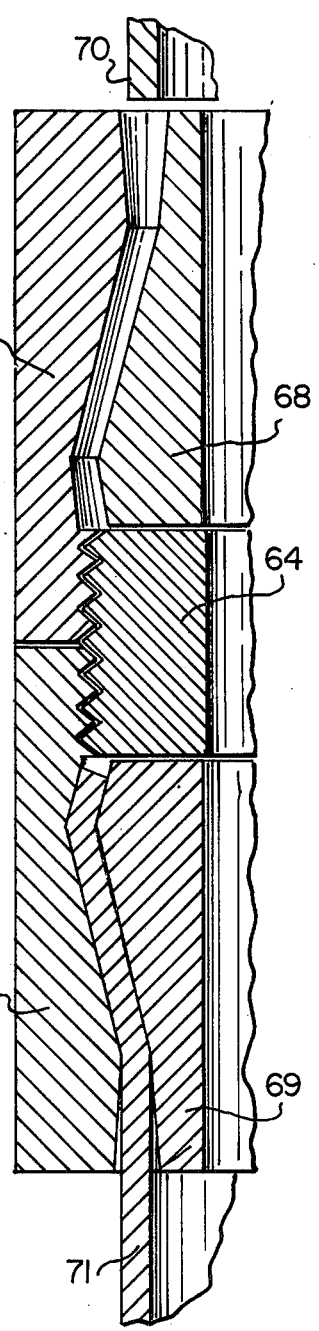
Figure 9:
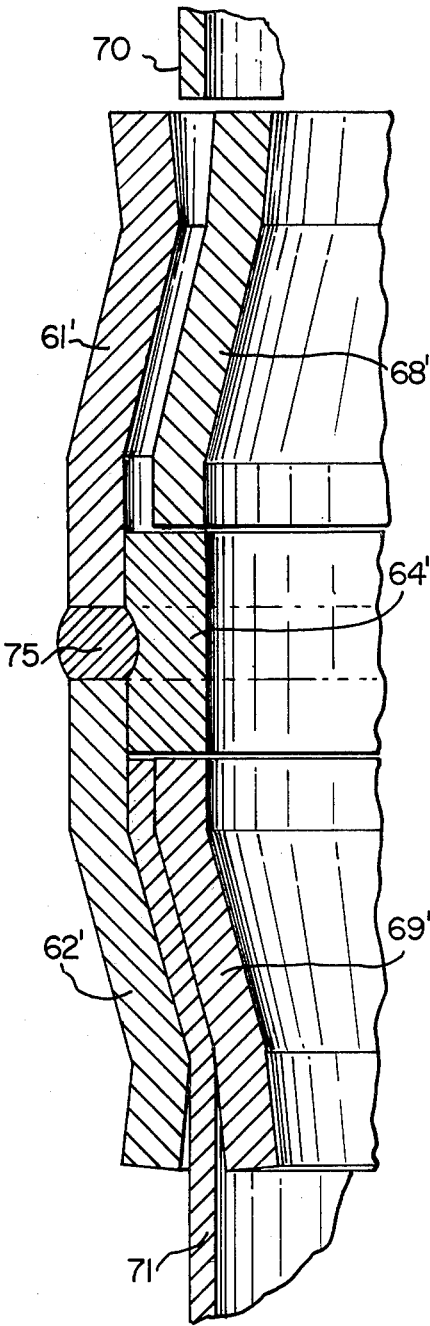

FIGS. 7, 8 and 9 show variations of a force fit coupling which enables deformation, that is expansion of the pipe sections as they are driven into the coupling by an amount which exceeds twice the wall thickness of the pipe sections.

FIG. 7 shows a coupling 60 comprising two external ring members or sleeves 61 and 62 having threads 63 internally thereof and joined by an exteriorly threaded ring member 64 on which the ring members 61 and 62 are screwed into butting contact. The internal surface of each of the ring members 61 and 62 comprises a conical, flared outer portion 65, a conical mid-portion 66 extending from this portion 65 toward the threaded ring member 64, and a cylindrical portion 67 extending to the threads 63.

Two auxiliary ring members 68 and 69 are disposed concentrically within the interior surface of the two exterior ring members 61 and 62. The exterior surface of the ring members 68 and 69 conform to the interior surfaces 65, 66 and 67 of the outer ring members 61 and 62 so as to provide an annular socket therebetween into which the pipe sections 70 and 71 may be respectively driven or forced.

It will be noted that the slope of the conical surfaces 66 is such that the pipe sections will be expanded more than twice the thickness of the pipe sections. It will be further noted that the outer ring members 61 and 62 must be assembled on the ring member 64 after the internal ring members 68 and 69 are disposed endwise into the outer ring members. This is the case because the diameter of the auxiliary ring members 68 and 69 is larger than the diameter of the flared openings in the outer ring members and could not be assembled endwise into the outer ring members 61 and 62 after they are joined together on ring 64.

The coupling shown in FIG. 8 is quite similar to that of FIG. 7 and corresponding parts will be identified by the same reference numerals as in FIG. 7 without additional description. The coupling in FIG. 8 differs from that in FIG. 7 in that the innermost portion of the annular sockets formed between the outer ring members 61, 62 and the inner ring members 68, 69 is not cylindrical but is conical and is tapered inwardly toward the ring 64. Thus, the ends of the pipe sections 70, 71 are reduced in diameter after being expanded in diameter. Thus, under tension, the pipe sections grip the inner ring members 68 and 69 which thus provide corresponding internal support for the ends of the pipe sections and resist collapse of the pipe sections.

The coupling shown in FIG. 9 is similar to that of FIG. 7 but, to avoid repetitious description, elements in FIG. 9 will be identified by corresponding reference numerals with the prime (') suffix. The outer ring members 61' and 62' and inner ring members 68' and 69' may be machined parts. Moreover, the central ring member 64' and the two outer ring members 61' and 62' are assembled as by a circumferential weld 75.

FIGS. 10 and 11 show two variations of a similar form of coupling, and corresponding elements in the two Figures will be referred to by the same reference numeral except in FIG. 11 a prime (') suffix will be used. Referring to the drawings, these couplings comprise an outer sleeve 80,80' and two internal shorter sleeves 81,81' and 82,82'. The outer sleeve 80,80' has an internal projection 83,83' extending radially inward from the wall of the outer sleeve. The projection 83,83' is stepped to provide a shoulder 84,84' having a radius slightly larger than the outer diameter of the inner sleeves, whereby the inner sleeves are centered concentrically within the outer sleeve in spaced relation. In the coupling of FIG. 10, the interior surface of the outer sleeve 80, at opposite ends of the sleeve, comprises a tapered or flared surface 85, a conical midportion 86 and an inner cylindrical surface 87 of uniform radius. The inner sleeve 81 has an outer surface with a contour matching that of the outer sleeve to provide an annular socket which expands from a flared entrance to a cylindrical portion of uniform radius.

In the coupling of FIG. 11, the internal surface of the outer sleeve differs in contour from that of FIG. 10 and comprises a conical or flared surface 85', a surface 88 of uniform radius and relatively short length, a tapered or conical surface 86', and a cylindrical surface 87' of uniform radius terminating at the projection 83'. The outer surface of the inner sleeves 81', 82' has a contour matching that of the interior surface of the outer sleeve 80'.

Pipe sections 90 and 90' are shown in FIGS. 10 and 11 respectively in position for entry into the annular socket of the couplings.

The form of coupling shown in FIG. 11 is somewhat stronger under tension than that of FIG. 10 by reason of the portion of the annular socket of uniform radius between the outer flared portion and the inner conical portion. It will be seen that, when the coupling of FIG. 11 is subjected to tension to the point of ultimate failure, the length of the surface 88 of the outer sleeve provides a greater amount of metal which must be expanded by pulling the wedge reenforced pipe section out of the coupling.

Figure 12:
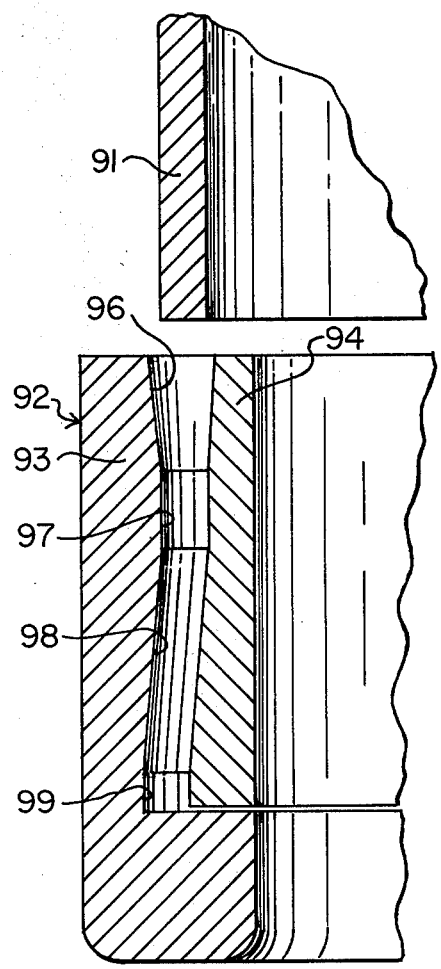
FIG. 12 is a fragmental sectional view, showing an end ring for a pipe or pipe pile embodying a wedge-tight coupling therein.

Referring to FIG. 12, a form of the invention is shown which is adapted as a reenforcement for the end of an open-end pipe pile 91. As shown, an end cap of fitting 92 for the end of the pipe pile section 91 comprises an outer sleeve portion 93, and an inner wedge or sleeve portion 94. The annular socket formed between the outer and inner sleeve comprises an outer flared portion 96, a portion 97 of uniform radius, a conical portion 98 which expands to a cylindrical portion 99 of uniform radius.

Figure 13:
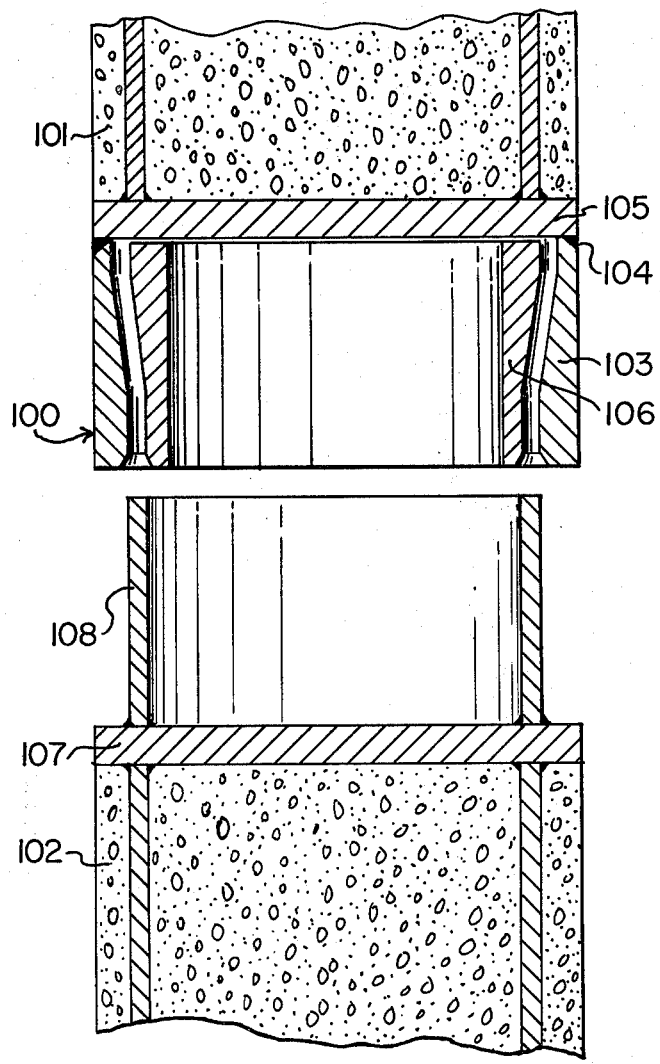
FIG. 13 is a fragmental sectional view, showing a form of coupling embodying the wedge-tight principle for coupling two sections of reenforced concrete pipe pile.

FIG. 13 shows an adaptation of the wedge-tight principle of the invention to a coupling for reenforced precast concrete pipe pile. The coupling 100 for the two concrete pipe pile sections 101 and 102 comprises an outer sleeve or ring 103 welded circumferentially at 104 to the end plates 105 of the pipe pile section 101 and an inner or wedge sleeve 106 which has an outer surface matching the inner contour of the outer sleeve 103.

The pipe pile section 102 has an end plate 107 to the outer face of which is welded a short section 108 of pipe pile.

As will be apparent, the pipe pile section 108 is forced or driven into the annular socket of the coupling 100 to effect a coupling of the two pipe pile sections. While not shown, it will be understood that the wedge sleeve 106 may be held temporarily in position by an auxiliary means, similar to the adhesive strips 20 of the coupling in FIG. 1.

While specific embodiments of the invention have been shown and described, it will be understood that variations therein are possible within the terms of the following claims.

I claim:

1. A force fit coupling for so joining two sections of plain end pipe and pipe pile as to form a high tensile strength joint, said coupling comprising a retaining sleeve having a radial projection thereon and two separate wedge sleeves positioned in concentric coaxial relation to the retaining sleeve at opposite sides of the radial projection, each of said wedge sleeves having an outer conical surface which matches a corresponding inner conical surface on said retaining sleeve and abuts said radial projection so as to provide an annular socket therebetween wherein said sleeves are engaged by a pipe and pipe pile that is driven axially therein by force to deform said pipe sections radially, said wedge sleeves serving not only to deform pipe sections when driven axially into said socket but also to strengthen them against redeformation by pull-out forces.

2. A force fit coupling according to claim 1, in which the retaining sleeve concentrically surrounds the wedge sleeves and said radial projection extends inwardly between the ends of the several wedge sleeves which abut said radial projection when the pipe sections are driven axially into said annular socket.

3. A force fit coupling according to claim 1 wherein the retaining sleeve is concentrically surrounded in axial spaced relation by said wedge sleeves and said radial projection extends radially outward from the retaining sleeve between the ends of said wedge sleeves said wedge sleeves abutting said radial projection when said pipe and pipe pile is driven axially into said socket by force.

4. An annular end cap for attachment to the end of a plain end pipe section and pipe pile to constitute reenforcement therefor, said end cap constituting a force fit coupling of high tensile strength, said coupling comprising a retaining sleeve having an inner conical recess and a separate wedge sleeve positioned in concentric relation within the retaining sleeve and having an outer conical surface matching the inner conical recess on said retaining sleeve, to form an annular recess therebetween, said sleeves being effective when engaged by the end of the pipe section as it is forced axially into said recess to deform the pipe section radially, said wedge sleeve serving not only to assist in effecting deformation of the pipe section radially as the pipe section is driven axially by force into said recess but also to strengthen said pipe section against re-deformation by pull-out forces.

5. An annular end cap according to claim 4, wherein the said conical recess in said retaining sleeve comprises two axially spaced conical surfaces, a cylindrical surface between the said axially spaced conical surfaces, and a cylindrical surface at the inner end of one of said conical surfaces, and wherein the outer surface of said wedge sleeve comprises matching surfaces concentrically spaced radially inwardly of the surface of the said retaining sleeve.

6. A force fit coupling for joining two sections of reinforced precast concrete pile, said coupling comprising a reinforcing metal sleeve attached coaxially to the end of one section of pipe pile and having an inner conical surface with cylindrical surfaces at opposite ends thereof, a separate wedge sleeve having an outer surface matching that of the said reinforcing metal sleeve and disposed in concentric spaced relation within said reinforcing metal sleeve to form an annular socket, a metal pipe section on the other of said two sections of reinforced precast concrete pile adapted to be driven by force into said socket, said sleeves being effective upon engagement by said pipe-section when driven by force into said socket to cause radial deformation of the said metal pipe section, said wedge sleeve functioning also to support said metal pipe section and resist re-deformation thereof when the other section of precast concrete pipe is subjected to a tensile force tending to pull the sections of precast pipe pile apart.

7. A force fit coupling for joining two plain end pipe sections of different diameters respectively, said coupling comprising a main ring member having a central circumferential shoulder projecting radially inward from the wall of said ring member, the internal surface of said main ring member having a conical recess on one side of said shoulder and a second conical recess on the other side of said shoulder, and two separate metal ring members respectively disposed in concentric relation within the conical recesses of the main ring member, and adapted to abut said shoulder, said separate metal ring members having conical surfaces matching the conical surfaces on the main ring member which serve to engage and deform the pipe sections radially as they are forced axially into the annular space between the main ring member and the separate metal ring members and which resist re-deformation of the pipe sections when the pipe sections are subjected to tensile forces tending to pull them out of said coupling.

8. A force fit coupling for joining two plain end pipe sections of different diameters respectively, said coupling comprising a main ring member having two radially extending shoulders in axially separated relation, an exterior conical surface adjacent one of said shoulders, an interior conical surface adjoining the other of said shoulders, and two separate metal rings, one of which is of conical shape and concentrically surrounds said exterior conical surface in spaced relation and abuts said one shoulder when a pipe section is driven by force between the ring members, and the other of which rings has an exterior conical surface matching that of the interior conical surface and which is disposed in concentric spaced relation to the conical surface on the said main ring and which abuts the other of said shoulders whereby said pipe sections are deformed radially when said pipe is forced axially between said conical surfaces.

9. A force fit coupling according to claim 8, wherein an exterior cylindrical surface is interposed between the exterior conical surface and said one of the shoulders, an interior cylindrical surface is interposed between the said interior conical surface and the other of said shoulders, and wherein the said two separate metal rings have respective cylindrical surfaces thereon to match that of the recesses in said main ring member.

10. A force fit coupling for so joining two sections of plain end pipe and pipe pile as to form a high tensile strength joint, said coupling comprising two outer metal rings joined in end-to-end coaxial relation, a central ring element secured interiorly of said rings at the juncture thereof, and two separate inner metal ring elements disposed in concentric spaced relation within said metal rings and movable axially so as engage said central ring element in abutting relation on opposite sides, the interior of said metal rings having a conically tapered surface and the exterior of said ring elements having a conforming conically tapered surface, said outer and inner metal rings being engaged by said pipe sections when forcefully driven axially therebetween to effect radial deformation of said pipe sections, said separate ring elements also serving to support the pipe sections against re-deformation as tension force is exerted on the pipe sections tending to pull them outwardly out of the coupling.

11. A force fit coupling according to claim 10 wherein said two metal rings are joined in end-to-end coaxial relation to each other and said central ring element is secured interiorly thereof by a single circumferential weld.

12. A force fit coupling according to claim 10 wherein the maximum exterior diameter of said two separate inner metal rings exceeds the minimum internal diameter of said two outer metal rings, whereby the degree of radial deformation of the pipe sections as they are forced therebetween exceeds twice the wall thickness of the pipe sections.

13. A force fit coupling for so joining two sections of plain end pipe and pipe pile as to form a high tensile joint, said coupling comprising two outer metal rings joined in end-to-end coaxial relation, a central ring element secured interiorly of said rings at the juncture thereof, said outer rings having corresponding interior contours comprising a first conical surface, a second conical surface of increasing diameter toward said central ring element, and a third conical surface of a decreasing diameter toward said central ring element, and two separate wedging ring elements disposed in concentric spaced relation within the said outer metal rings respectively and adapted to abut said central ring element, said ring elements having an external surface matching that on the outer metal rings and being effective to cause expansive deformation of the pipe sections as they are forced axially into the annular pocket between the outer rings and the wedging rings, said wedging ring elements being conversely effective to support said pipe sections against reverse deformation as the pipe sections are pulled out of the coupling.

14. A force fit coupling according to claim 1 or 2, wherein the said radial projection is stepped to provide an annular shoulder on opposite sides thereof against which the wedge sleeves abut to insure coaxial relationship of said wedge sleeves with respect to said retaining sleeve.

* * * * *

UNITED STATES PATENT AND TRADEMARK OFFICE
CERTIFICATE OF CORRECTION

PATENT NO. : 4,274,665

DATED : June 23, 1981

INVENTOR(S) : RICHARD O. MARSH, JR.

It is certified that error appears in the above-identified patent and that said Letters Patent are hereby corrected as shown below:

Column 1, line 44, "wedgetight" should be --wedge-tight--.

Claim 1, column 6, line 49, after "deform", --the-- should be inserted.

Claim 5, column 7, line 22, "surface of" should read --surface on--.

Signed and Sealed this

First Day of September 1981

[SEAL]

Attest:

GERALD J. MOSSINGHOFF

Attesting Officer

Commissioner of Patents and Trademarks